United States Patent [19]
Kennedy

[11] 4,058,835
[45] Nov. 15, 1977

[54] SCAN CONVERSION APPARATUS
[75] Inventor: Paul G. Kennedy, Monroeville, Pa.
[73] Assignee: Westinghouse Electric Corporation, Pittsburgh, Pa.
[21] Appl. No.: 522,189
[22] Filed: Nov. 8, 1974
[51] Int. Cl.² .............................................. H04N 7/12
[52] U.S. Cl. .................................... 358/134; 358/138; 360/9
[58] Field of Search ................. 358/85, 134, 137, 138; 360/9, 10, 33

[56] References Cited
U.S. PATENT DOCUMENTS

| | | | |
|---|---|---|---|
| 3,526,900 | 9/1970 | McCoy | 360/29 |
| 3,564,127 | 2/1971 | Sziklai | 360/9 |
| 3,792,194 | 2/1974 | Wood | 358/194 |

Primary Examiner—Howard W. Britton
Attorney, Agent, or Firm—D. Schron

[57] ABSTRACT

A standard television picture is transmitted over conventional phone lines by sampling and storing one picture element per TV line, and transmitting the information of the stored samples over the phone line as a reduced bandwidth television signal. At the receiver end the transmitted signal is placed into storage and extracted at standard TV rates and written as a TV line onto a rotating video disc. The process is repeated until the final picture to be displayed is assembled on a line-by-line basis on the disc.

14 Claims, 25 Drawing Figures

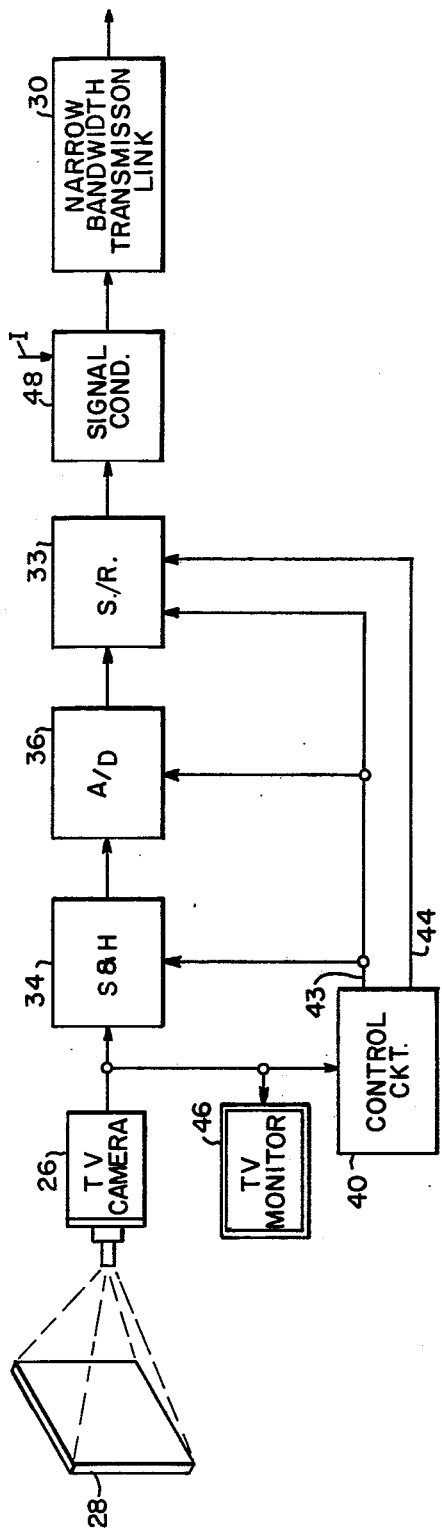
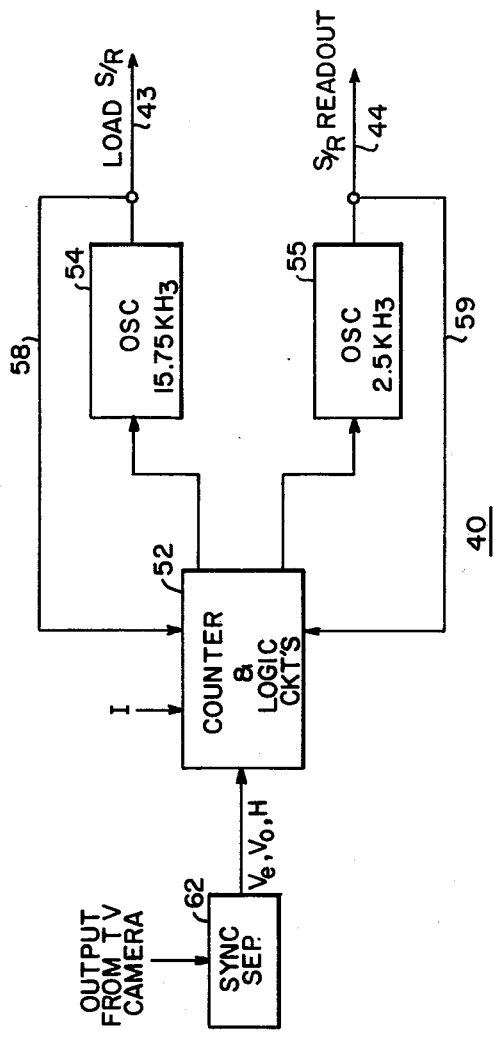
FIG. 4
FIG. 5

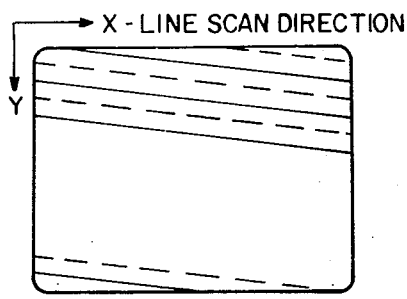
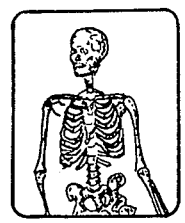
FIG. 12    FIG. 11
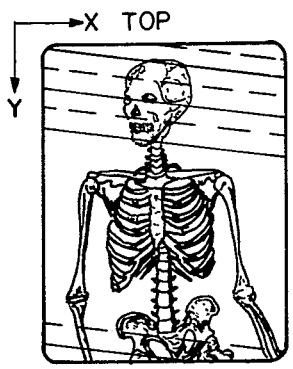
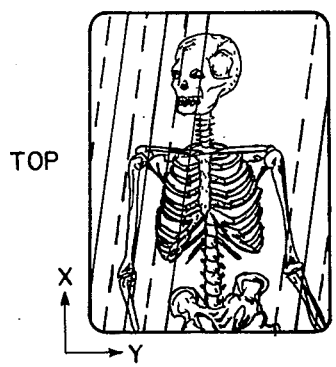
FIG. 13    FIG. 14
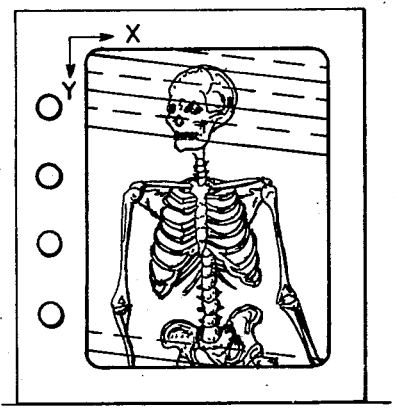
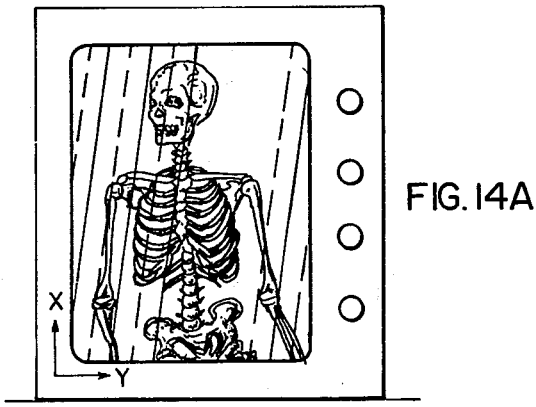
FIG. 13A    FIG. 14A
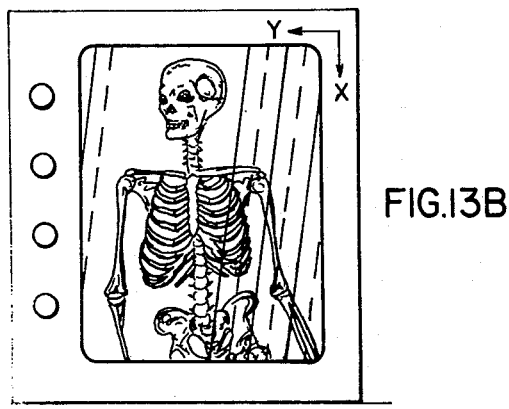
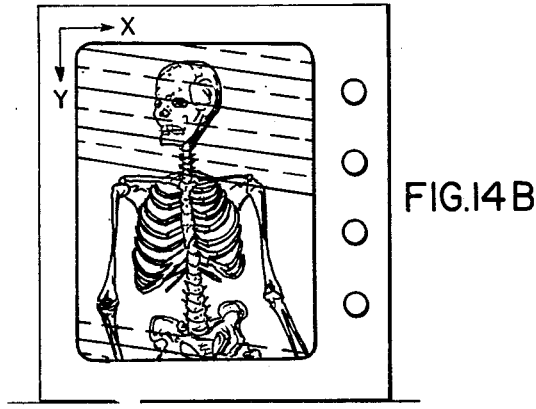
FIG. 13B    FIG. 14B

SCAN CONVERSION APPARATUS

BACKGROUND OF THE INVENTION

1. Field of the Invention

The invention in general relates to scan conversion apparatus, and particularly to a low cost system particularly well adapted for transmitting high quality pictures over low bandwidth transmission links.

2. Description of the Prior Art

A requirement exists for transmitting picture information over relatively narrow bandwidth channels, such as the conventional telephone line. Although facsimile machines are available for such transmission the quality and resolution of the received picture is not good enough for many intended purposes, for example in the remote diagnosis of transmitted X-ray pictures.

Systems for transmitting higher quality pictures includes the use of conventional TV cameras as well as slow scan cameras. Very considerable advantages can be realized by using a standard fast scan television camera instead of a slow scan camera in terms of relative cost for comparable picture qualities. In addition, in the slow scan camera arrangement a relatively long period of time is required to build up a displayed picture which makes initial adjustments and focusing, time consuming.

A system for transmitting high quality pictures over a narrow bandwidth transmission link, utilizing a standard TV camera is suggested in U.S. Pat. No. 3,792,194. Basically, each TV line of video from the standard camera is sampled many hundreds of times during the time of one TV line scan. The apparatus includes an analog-to-digital conversion, with the digital words describing each TV line being stored in a shift register and transmitted to the receiver via, for example, the telephone lines. At the receiver end, transmitted samples are stored in a register and provided to a rotating magnetic medium such as a video disc for display purposes. This system provides excellent quality transmitted pictures however where cost considerations are important, such technique requires the use of an extremely high speed analog-to-digital converter such converters being relatively expensive. In addition, the sampele and hold circuit required as well as the shift register at the transmitter location must be capable of operation of extremely high television data rates, a factor also adding to the cost of such system.

In another arrangement, as described in U.S. Pat. No. 3,564,127, only one picture element per TV line is sampled and then transmitted over a narrow bandwidth transmission link to a rotating magnetic medium such as a video disc. As the first picture element of each TV line is sampled and transmitted, the samples are placed into storage on the rotating disc (or drum) at evenly spaced apart locations. As the second picture element of each line is sampled and transmitted it is placed adjacent the first stored element on the disc, as the disc rotates, until such time as all of the picture elements have been sampled and reconstructed on the video disc. Such recording into adjacent locations during the revolution of the disc of an AM, or even a modulated signal, poses some technical problems with state-of-the art discs. In addition, if the frequency of picture element sampling is reduced, in order to be compatible with a further reduced bandwidth transmission link, picture elements transmitted adjacent in time will not appear adjacent on the final TV display, and due to the limitation of many narrow bandwidth transmission links, this operation will result in objectionable ghost effects on the display.

A method to write slow scan signals on a video disc is described in U.S. Pat. No. 3,526,900. With this arrangement, a slow scan TV line is sampled a number of times during the scan, the sampling being at a rate equivalent to a conventional TV line time. The sampled picture elements are distributed on the video disc as it rotates in order to build up a conventional TV signal. The TV raster is vertically scanned and sampled and rearranged so that transmitted samples are built up in a horizontal mode. Such technique described in the patent allows the recording of information onto the video disc, however, the sampled TV raster is produced by a slow scan camera and transmission at a conventional horizontal TV line rate would require the use of a bandwidth wider than conventional telephone bandwidths.

SUMMARY OF THE INVENTION

The present invention allows the transmission of extremely high quality pictures over relatively narrow bandwidth transmission links utilizing a standard fast scan TV camera. The system is easily adjusted for compatibility with not only the telephone line but with even narrower bandwidth transmission links. The system samples picture elements which lie along a line substantially orthogonal to the direction of line scan of a conventional TV camera and derives a reduced bandwidth television signal for transmission. After transmission by way of the narrow bandwidth link, the tranmsitted signal is processed and displayed as a single scanned TV line having the informational content of the picture elements lying along the said orthogonal line.

The transmitter portion of the apparatus includes means for sampling one picture element per scan line per TV frame, with the picture elements being the $i^{th}$ picture element of each line. These sampled elements are placed into a first storage means and are readout for transmission over the narrow bandwidth link, at a desired compatible rate as a reduced bandwidth television signal. The receiver portion of the apparatus includes a second storage means for storing the transmitted signal representative of the informational content of the $i^{th}$ picture elements. A recirculating storage means such as a rotating video disc receives the stored signal from the second storage means, at one location on the disc whereby it is readout and displayed on a TV monitor, such that the information contained in adjacent $i^{th}$ picture elements at the transmitter location is displayed as a single TV line on the monitor at the receiver location.

BRIEF DESCRIPTION OF THE DRAWINGS

FIG. 4 illustrates in block diagram form, the transmitter portion in accordance with the present invention;

FIG. 5 illustrates in block diagram form the control circuit illustrated in FIG. 4;

FIG. 11 illustrates an X-ray picture to be transmitted via the present invention;

FIG. 12 illustrates a typical scanning pattern of a television system;

FIG. 13 illustrates a modified scanning arrangement for a television camera;

FIG. 13A and 13B illustrate monitors at the transmitter and receiver locations respectively for the scanning arrangement of FIG. 13;

FIG. 14 illustrates an alternative scanning arrangement;

FIGS. 14A and 14B illustrate monitors at the transmitter and receiver locations respectively.

DESCRIPTION OF THE PREFERRED EMBODIMENT

Figure 1:
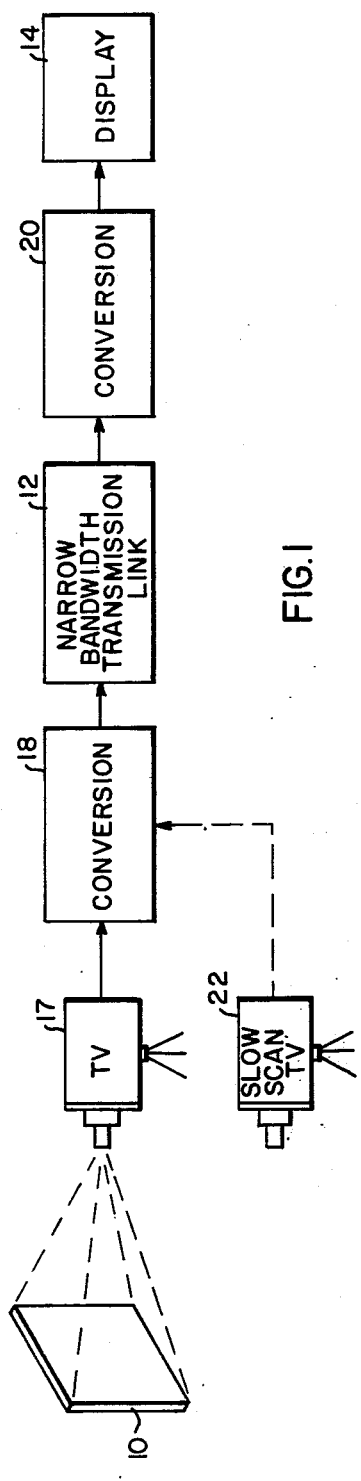
FIG. 1 illustrates in block diagram form, a typical system for transmitting TV pictures over a relatively narrow bandwidth transmission link.

FIG. 1 illustrates the basic components of a system for transmitting television pictures over narrow bandwidth transmission links. The information contained in a subject such as picture 10 is to be transmitted over a narrow bandwidth transmission link 12 and portrayed on a display 14, generally a TV monitor. In one arrangement use is made of a conventional fast scan TV camera 17 which produces a video signal of a bandwidth far greater than that of the transmission link 12. Accordingly, some sort of conversion apparatus 18 is provided for converting the fast scan TV signals to slow scan TV signals for transmission. At the receiver, a second conversion system 20 is provided for receiving the slow scan signals and processing them for conventional TV display.

As an alternative, a slow scan TV 22 may be provided for transmission of its output signals over the transmission link 12 either with or without modulation, depending upon the system. Due to the relatively high cost of high performance slow scan TV cameras and due to the initial time required in setting up a transmission for proper adjustment of focus and field of view, use of the standard television camera system is preferred.

Figure 2:
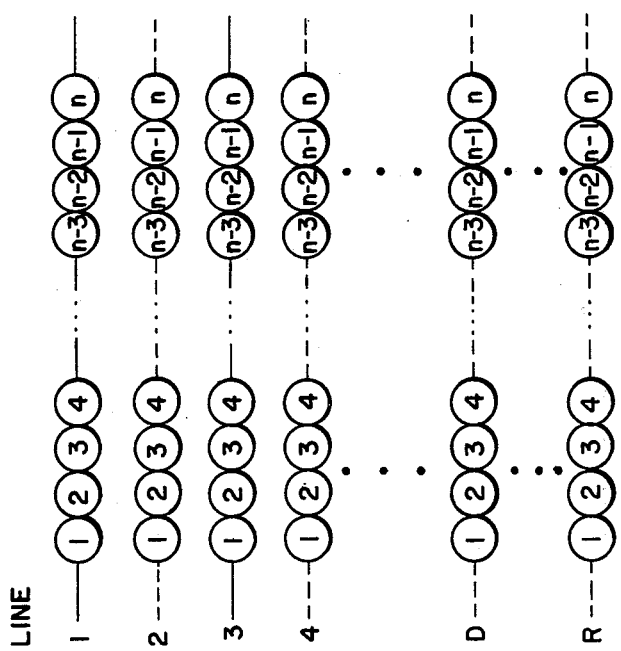
FIG. 2 serves to illustrate a typical scanning pattern of a television camera together with picture elements associated with the scanning operation.

FIG. 2 illustrates a typical TV raster or scan pattern. The raster is made up of a plurality of lines R however since some of the lines occur during vertical blanking, within which time the scanning beam returns to the top of the scanning pattern, only D lines are actually displayed on the TV monitor. Each line is composed of a number of adjacent elemental portions which are sampled and are herein termed picture elements, symbolically illustrated as the circles labeled $l$ to $n$ in the direction of scan.

In order to reduce flicker there is generally utilized an interlace scanning method wherein two scanning fields are produced for each complete picture frame. With this 2:1 interlace method, the scanning beam for one field scans lines 1, 3 and all the subsequent odd number lines. After vertical retrace the second field comprised of interlaced lines 2, 4 and all the remaining even lines are scanned.

Figure 3:
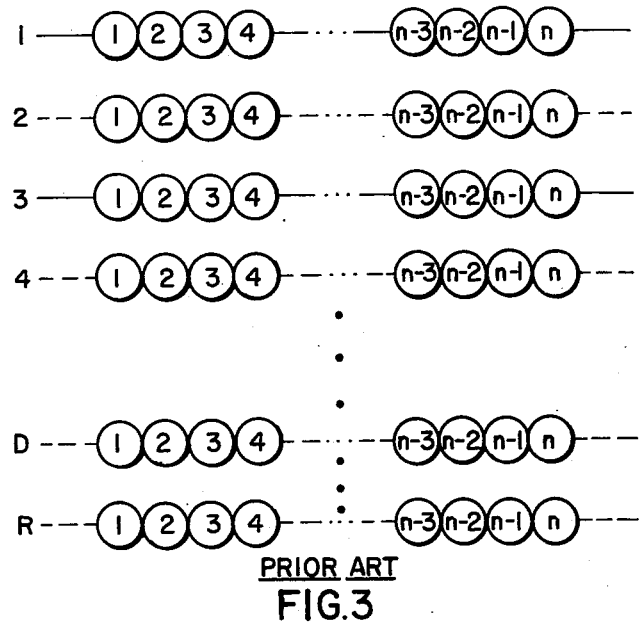
FIG. 3 serves to illustrate a scanning pattern together with picture elements, of a prior art type of display for displaying the picture elements of FIG. 2.

With a television camera scanning pattern as indicated in FIG. 2, FIG. 3 shows the resultant display of the system described in U.S. Pat. No. 3,564,127. Although one picture element is sampled per line, reconstruction is such that the resultant display is identical with respect to location of picture elements.

Figure 3A:
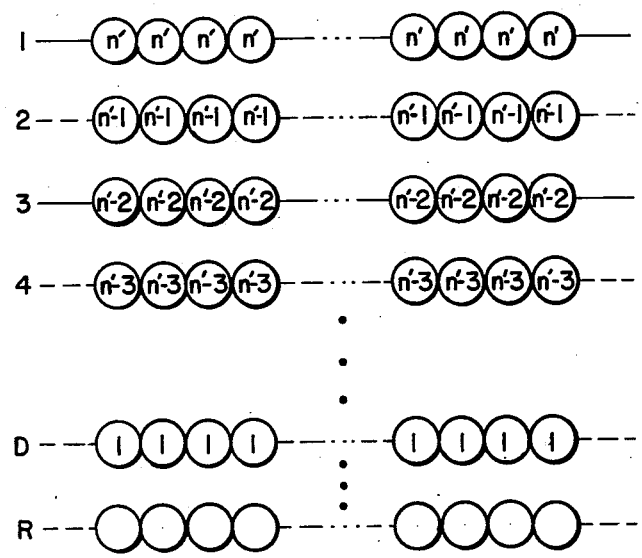
FIG. 3A illustrates the display scan pattern of the picture elements of FIG. 2, in accordance with the teachings of the present invention.

FIG. 3A illustrates the display obtained in the present invention, with a television camera scanning pattern of FIG. 2. It is seen that a vertical column of picture elements, in general the $i^{th}$ elements where $i$ is any number between 1 and $n$, have in effect been transposed and displayed as a horizontal line composed of primed reference character picture elements. In order not to reverse the transmitted image, the last picture elements, $n$, are sampled and transmitted first to form the first line of the transposed display.

FIG. 4 illustrates an embodiment of the present invention operable to transmit high resolution pictures over a wide variety of narrow band transmission links. Basically FIG. 4 represents the transmitter portion of the system and includes a standard fast scan TV camera 26 focused upon an object 28 the image of which is to be transmitted over a narrow band transmission link 30.

The video output signal from TV camera 26 is periodically sampled, with the samples being placed into a first storage means illustrated by way of example as the shift register section 33. The periodic sampling of the video signal is accomplished by means of a sample and hold circuit 34, and if the storage is digital, an analog-to-digital converter 36 is provided for converting the analog sample into digital form for storage into the storage register section 33.

The sampling, conversion and storage process is governed by a control circuit 40 which provides pulses at a predetermined sampling rate on output line 43, and produces pulses at a desired transmission rate on output line 44.

In order to perform the control operation, the output of the TV camera 26 is provided to the control circuit 40 so that synchronizing information therefrom may be utilized. In addition, the TV output is fed to a TV monitor 46 for viewing the object 28 at the transmitter location.

Basically, the control circuit 40 causes the sampling of one picture element per TV line. The analog value of the picture element sampled is converted to digital form and placed into the storage register section 33. When all of the $i^{th}$ picture elements from a vertical line have been sampled, converted, and stored, the control circuit 40 is operable to cause a readout of the shift register section 33 at a rate compatible with the narrow band transmission link 30. A signal conditioning circuit 48 is provided and may include by way of example such circuitry as preamplifiers, limiters, filters and if desired, modulation circuitry, in which case a digital-to-analog converter may also be employed. When a transmission is to take place, an initiation signal I may be provided to the signal conditioning apparatus 48 for transmission to the receiver location to prime it for reception.

The control circuit 40, illustrated in more detail in FIG. 5, includes counter and logic circuitry 52 which in response to the occurrence of certain signals, controls the turning on of either oscillator 54 or 55, oscillator 54 providing an output signal of a first predetermined frequency on line 43, and oscillator 55 providing an output signal of a second predetermined frequency on line 44.

The turning off of either oscillator 54 or 55 when a predetermined count has been attained, is accomplished by providing a running count to the counter and logic circuitry 52 via lines 58 and 59.

The counter and logic circuitry in addition to the initiation signal I, also receives information defining the start of a horizontal scanning line, and the odd and even vertical fields. This information is derived from sync separator 62 which provides these signals H, $V_o$, and $V_e$ in response to receipt of the video signal from the TV camera.

A typical operation will be described with reference to the timing diagrams of FIG. 6, and additional reference to FIGS. 4 and 5. The following parameters for a TV system will be used by way of example in explaining the operation of the present invention:

525 Line Raster
2:1 Interlace
262 1/2 Lines Per Field
13 Vertical Lines Blanking Per Field
249 1/2 Displayed Lines Per Field
499 Displayed Lines Per Frame
60 Fields Per Second
16.66 Milliseconds Per Field
33.33 Milliseconds Per Frame
63.5 Microseconds (0.0635 Milliseconds) time between adjacent vertical picture elements per field
53.3 Microseconds (0.0535 Milliseconds) displayed line time
2.0 KiloHertz — Approximate Transmission Link Bandwidth In a preferred embodiemnt, the number of picture elements per displayed line at the transmitter location will be equal to the number of lines in the transposed, finally displayed, picture at the receiver location. If the TV monitor display at the receiver has 499 displayed lines per frame then the aperture for each picture element (or the time between adjacent picture elements) will be the displayed line time of 53.5 microseconds divided by 499 (the number of displayed lines) or approximately 0.107 microseconds.

Figure 6:
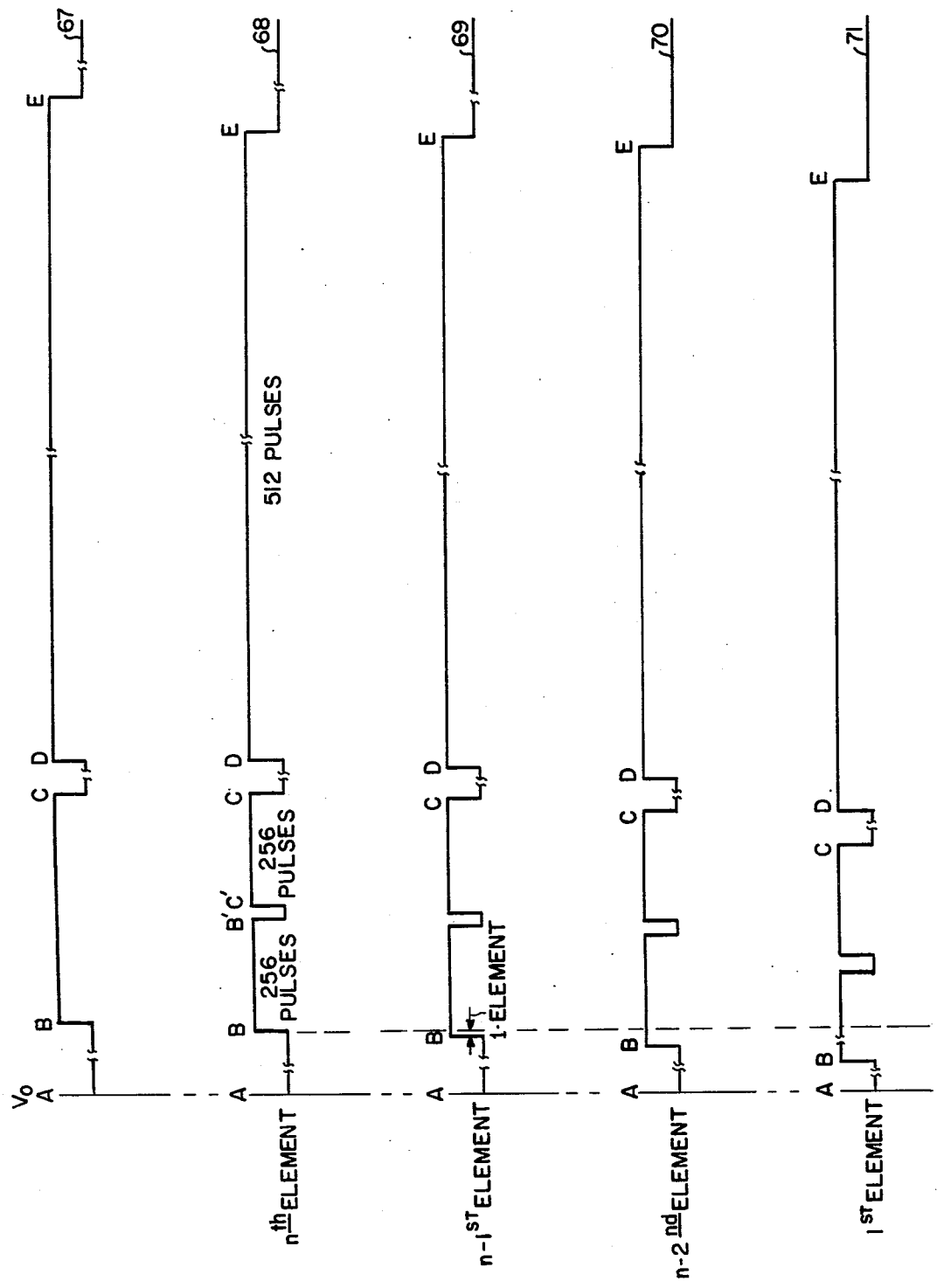
FIG. 6 illustrates waveforms to demonstrate the operation of the apparatus of FIGS. 4 and 5.

For all the curves 67 to 71 of FIG. 6, time A represents the start of a new frame as evidenced by the provision of a selected one of the vertical synchronizing signals, for example $V_o$. At the start of this new frame, the counter and logic circuitry 52 counts for a period of time equivalent to the number of lines in vertical blanking plus $n$ picture elements so that at time B oscillator 54 is turned on to start the sampling of picture elements commencing with the $n^{th}$ picture element of line 1. Since only one picture element is sampled per line, the time between samplings is 63.5 microseconds (one TV line time) so that oscillator 54 has a frequency of 15.75 kilohertz and provides an output pulse every 63.5 microseconds.

Thus, the first pulse causes the sampling of the $n^{th}$ picture element, its conversion to a digital value and placement into a first location in the storage register section 33. The second pulse provided by oscillator 54 causes a sampling of the $n^{th}$ picture element of the next line in the field (display line 3) its conversion to an equivalent digital form and its placement into the storage register section 33 with a consequent shifting of the information that was previously stored. The process is continued until time C, at which point all of the picture elements $n$ will have been sampled, converted, and placed into the shift register section 33. At time C thereafter oscillator 54 turns off and commencing at time D oscillator 55 will be turned on to provide the shift register section 33 with readout pulses. Oscillator 55 preferably is made adjustable to be compatible with the transmission link, and in the present example oscillator 55 will have a frequency of 2.5 kilohertz thus providing one pulse every 400 microseconds on line 44. At time E all of the stored information will have been transmitted and a sampling of picture elements $n$-1 will next take place beginning at a subsequent time A following time E.

Each field consists of 262 1/2 lines, however approximately 13 of these lines are vertical blanking conveying no information. Accordingly, the shift register section 33 does not have to be big enough to accommodate all 525 samples of a complete raster. Shift registers are commercially available with storage capacity in binary multiples. The shift register arrangement may be 16 rows of 256 bits each thus allowing the information used to describe the sampling from a single field to be stored in eight rows of 256 bits each. For the next field, the other 8 by 256 portions can be utilized thus curve 68 of FIG. 6 illustrates that the sampling beginning at the time B will continue for 256 sampling pulses until time B' and will commence again at time C' for 256 pulses to time C. This somewhat shortens the transmission time from D to E since only 512 samples will have to be transmitted instead of 525 as was the case of curve 67.

Curve 69 represents the time scale for sampling all of picture elements $n$-1. Very basically, at the beginning of a new frame $V_o$ after time E, the counter time from A to B is reduced by the time of one picture element for each new frame. Curve 70 shows the timing for sampling picture elements $n$-2 and time B of curve 70 occurs one picture element before time B of curve 69 and two picture elements before time B of curve 68. A new vertical column of picture elements is sampled commencing with the predetermined frame after time E. Curve 71 illustrates the timing relationship with respect to picture element 1 whereby time B occurs 13 TV line times after vertical retrace commencement and n picture element times advanced from time B or curve 68. In the present example, $n$ is 499.

The counter and logic circuitry 52 of FIG. 5 is illustrated as turning on and off oscillators 54 and 55 in response to the occurrence of certain events and the attainment of certain counts as demonstrated by the timing diagrams of FIG. 6. Other arrangements whereby the oscillators may be continuously running with proper gating logic utilized to provide the output signals are evident.

Figure 7:
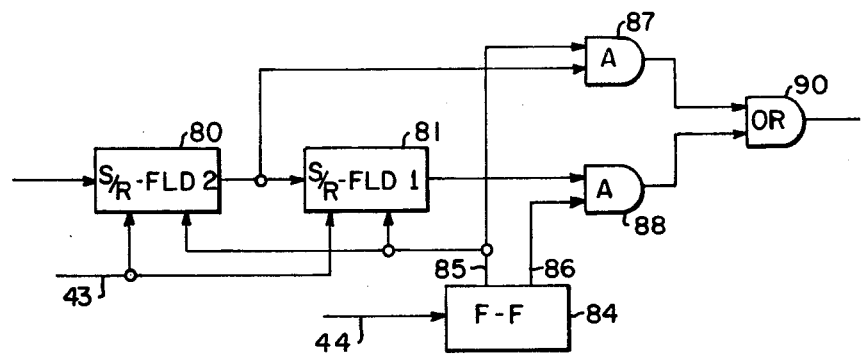
FIG. 7 illustrates the storage register section of FIG. 4 for a system which utilizes interlacing.

In the present invention, the information contained in vertically adjacent picture elements is displayed as horizontally adjacent picture elements. If the $i^{th}$ picture element of the first row is sampled, the very next sample taken will be the $i^{th}$ picture element of the next scanned line, which in a 2:1 interlaced system will actually be the third line of the displayed picture. The $i^{th}$ picture elements between the lines of the odd field will be those of the even field. That is, for a 2:1 interlaced system, physically adjacent vertical picture elements are not sequentially sampled. In order however to transmit them, or the information represented thereby, in a sequential manner to be displayed horizontally adjacent, the storage register section 33 is constructed and arranged to store samples from the first and second fields into respective first and second registers (which may be first and second portions of a single register) and to thereafter transmit stored samples alternatively from the first and second registers. FIG. 7 illustrates an arrangement for accomplishing this operation.

The shift register section 33 includes a first shift register 80 and a second shift register 81, serially arranged with each being capable of storing 256 eight bit digital words.

Pulses on line 43 cause the shifting of information down the shift registers. When 256 samples of the $i^{th}$ picture elements of the first field have been taken, shift register 80 will be filled to capacity. As the samples of the $i^{th}$ picture elements of the second field are taken the information previously stored in shift register 80 will be transferred word-by-word to shift register 81 as the shift register 80 is filling up. At the end of the sampling operation therefore shift register 81 will contain the samples from the first field and shift register 80 will contain the samples from the second field.

For transmission over the narrow band transmission link, the stored words in shift registers 80 and 81 are readout alternatively. One way of accomplishing this is by the provision of a flip-flop 84 which receives input pulses on line 44 and provides an output enabling signal alternately on outputs 85 and 86. One of the outputs, for example output 85 is utilized as the shift command for the shift registers 80 and 81. AND gating circuits 87 are operable, when enabled, to pass digital words stored in shift register 80 and AND gating circuits 88 are operable, when enabled, to pass digital words stored in shift register 81. The alternate enabling of these AND gating circuits is accomplished with the outputs of flip-flop 84 being connected to respective AND gating circuits. OR gating circuits 90 receive the digital words from either AND gating circuits 87 or 88 and pass them on for subsequent signal conditioning and transmission. Thus with sequential input pulses on line 44 the information in physically adjacent picture samples in a vertical column is transmitted adjacent in time.

The sampling rate for deriving the reduced bandwidth television signal for transmission is chosen not only in view of the transmission link bandwidth but also in view of the signal conditioning such as filtering and modulation, if any.

For example rather than transmit the binary words in shift register section 33 as the reduced bandwidth television signal, the word may be converted to analog form for transmission either with or without modulation as required by the transmission link.

Figure 8:
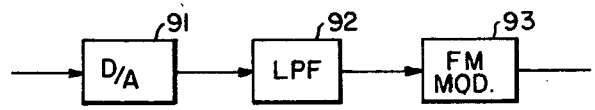
FIG. 8 illustrates in block diagram form, typical signal conditioning apparatus.
Figure 8A:
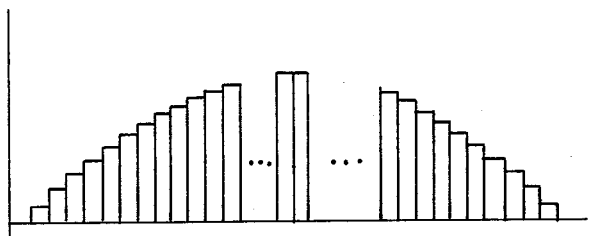
FIG. 8A to 8C illustrate waveforms present in the apparatus of FIG. 8.
Figure 8B:
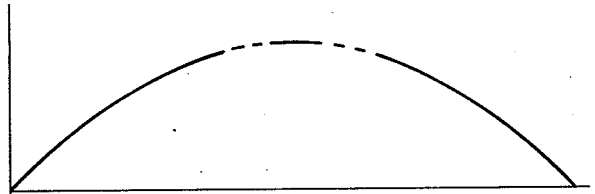

FIG. 8 illustrates by way of example a typical conditioning. As each digital word is clocked out of shift register section 33 (FIG. 4) it is converted to analog form in the digital-to-analog converter 91. The spaced vertical lines of FIG. 8A represent the transmission clocking rate and magnitude of analog signal. In order to eliminate any sharp edges on the analog signal, it is passed through a low pass filter 92 having a cut off frequency of, for example, 1 KHz. The resultant signal is illustrated in FIG. 8B.

Figure 8C:
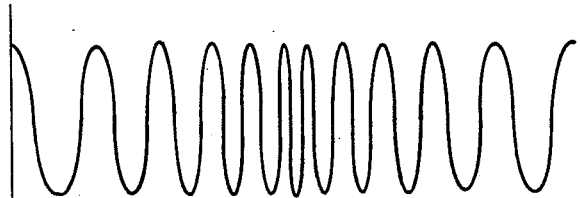

The filtered signal is provided to a modulator such as FM modulator 93 for transmission, the FM signal being illustrated in FIG. 8C, and representing the information contained within vertically adjacent picture elements of one column.

Figure 9:
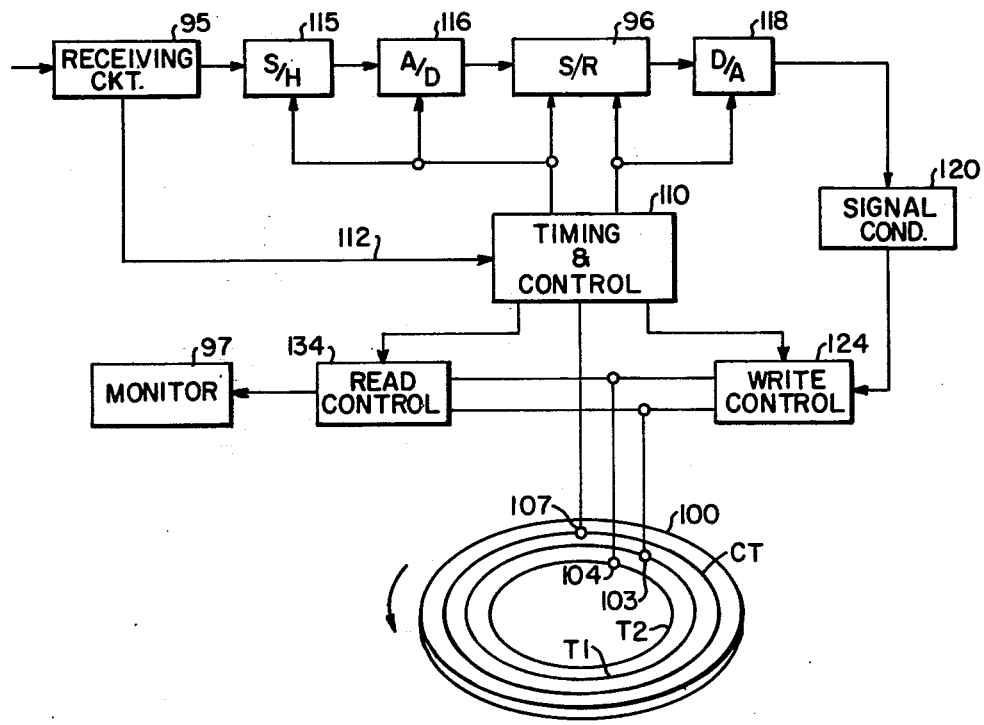
FIG. 9 is a block diagram illustrating the receiver portion of the present invention.
Figure 9A:
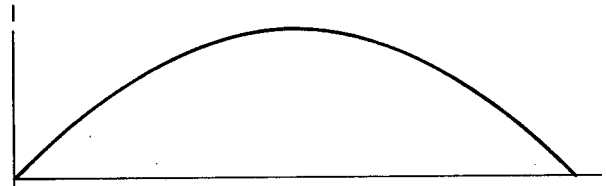
FIGS. 9A and 9B illustrate waveforms present in the apparatus of FIG. 9.

The receiver portion of the apparatus is illustrated in FIG. 9 and the processing includes receiving circuit 95 having demodulating means for demodulating the transmitted reduced bandwidth television signal, the demodulated equivalent being illustrated in FIG. 9A.

This signal is stored in a second storage means in the form of shift register section 96 for eventual display as a single scan line on a conventional TV monitor 97.

As a cost saving alternative the signal as illustrated in FIG. 9A may be fed directly to a cathode ray tube to modulate the brightness of a sweeping cathode ray beam. Photographic film placed in front of the tube will then yield an exposed picture containing the transmitted information. Other storage devices such as a storage tube may also be utilized.

Figure 9B:
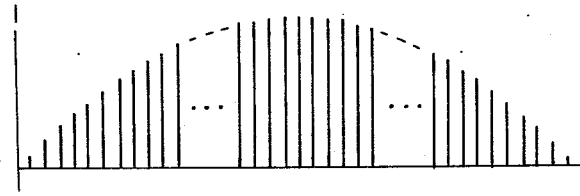

As will be described, in the present example the signal of FIG. 9A is sampled at a predetermined rate, as illustrated in FIG. 9B for conversion into digital form. This rate need not be the same as the transmission sampling rate of FIG. 8A, however if all of the information contained in the signal of FIG. 9A is desired then the sampling rate should be greater than twice the maximum frequency contained therein. In the present example this maximum is 1 KHz, the cut off frequency of the low pass filter in FIG. 7.

For accomplishing the assembly of an entire TV picture, there is provided a recirculating storage means such as a rotating video disc 100. With a disc rotation of 3600 rpm the disc makes one revolution per TV field. It is common in such instance to record all the TV lines of one field onto a first track and all the TV lines of the second field onto a second track. These tracks are designated T1 and T2. In order to read information into and out of storage locations on the tracks there is provided high quality read-write heads 103 and 104.

A read head 107 is positioned over a third track CT which is a clock track providing a source of clock pulses to the timing and control circuit 110. The receiving circuit 95 additionally includes a filter or detector for the transmitted initiation signal I so that a reference pulse may be supplied to the timing and control circuit 110 by way of line 112.

As previously stated, after signal conditioning, the transmitted information is sampled and converted to digital form for storage into the shift register section 96. This is accomplished by provision of sample and hold circuit 115 and analog-to-digital converter 116 all receiving control pulses from an oscillator in timing and control circuit 110.

After all of the samples, of the transmitted reduced bandwidth television signal have been stored in the shift register section 96 they are shifted out one word at a time under control of the timing and control circuit 110 and converted back into analog form by the digital-to-analog converter 118. The signal conditioning circuit 120 provide the usual signal conditioning to the converted signal, and the timing and control circuit 110 provides a command signal to the write control 124 to insure that each converted stored word gets written into adjacent storage locations on one of the tracks T1 or T2. The unloading of the shift register section 95 is done at video rates such that unloading takes place in 53½ microseconds, the time of a TV display line.

Figure 10:
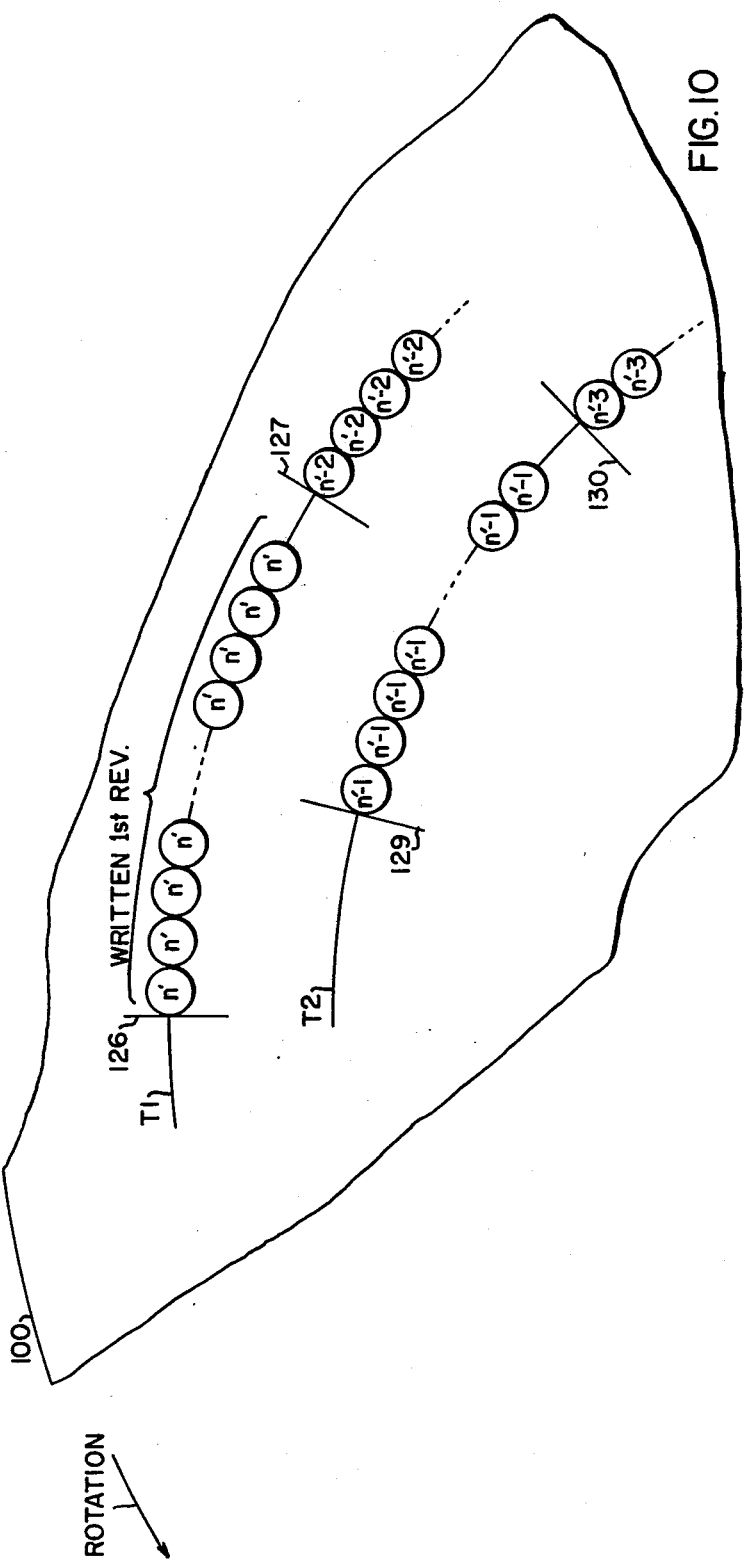
FIG. 10 illustrates a portion of a video disc with information written in, in accordance with the teachings of the present invention.

FIG. 10 illustrates the way the information is written into storage on the disc 100. The spacing between lines 126 and 127 represents one complete TV line or 63.5 microseconds. The information represented by the $n^{th}$ picture elements (FIG. 2) is stored as a continuous signal represented in FIG. 10 by the picture elements labeled $n'$. The number of elemental portions or picture elements is governed by the number of samples taken of the reduced bandwidth television signal. The writing in of individual picture element values, takes place within the time that reference lines 126 and 127 pass under head 103. A space of approximately 10 microseconds is left between the last picture element value and reference line 127, corresponding to horizontal blanking and sync which may be added in any well known manner.

In the preferred embodiment the next transmitted signal is that made up of information of picture elements $n-1$ (FIG. 2). With a 2:1 interlace system this will form the first line of the other field and consequently the information content will be written as a continuous signal represented by elements $n'-1$ on track 2 between lines 129 and 130 as illustrated and displaced one-half TV line from the first line of the other field on track 1. (Assuming that heads 103 and 104 are on the same radial line.) This gives a required $\frac{1}{2}$ TV line delay which alternatively could be provided electronically.

The next transmitted signal containing the information of picture elements $n-2$ will form the second line of the first field and is written on track 1 as represented by elements $n'-2$. The process of writing into alternate track locations is continued until all of the information of all $n$ columns has been transmitted.

After all of the information has been recorded on both tracks, the timing and control circuit 110 is operable to enable the read control circuit 134 to read alternate fields for portrayal of the information on the monitor 97. Read control circuit 134 reads alternately from heads 103 and 104 such that alternate fields are presented for each revolution and an entire frame is presented for each two revolutions of the disc 100.

In many instances it is desired to transmit a plurality of images and rather than erase the information on tracks T1 and T2 the new information may be written into additional tracks (not illustrated) generally provided with commercially available video disc equipment. Thus with a simple selection switch, an operator may choose to portray on monitor 97 any one of a number of previously transmitted pictures. Where there is a need to simultaneously compare pictures, additional monitors may be provided, or photographic equipment may be utilized to take pictures of the display. Various other types of signal processing arrangements may also be provided such as comparison on one display, color highlighting, the name a few.

Video discs rotatable at a constant speed of 1800 rpm are also commercially available. With such disc, all of the information relative to a complete TV frame may be written on one track with the first half of the track containing the information relative to the first field, and the other half of the track containing information relative to the second field.

Extremely high quality pictures can be transmitted over the conventional telephone lines utilizing the present apparatus. The information from adjacent picture elements is transmitted adjacent in time and appears adjacent on the final display, so that objectionable ghosting which may be caused by the transmission link is negligible and that which exists can be compensated for by conventional means utilizing simple filters and delay equalizers. The apparatus finds use in a wide variety of fields and is particularly useful for remote diagnosis of X-ray pictures. For such use, as well as for use in other fields, the object picture may have a certain aspect ratio which does not exactly conform to the TV camera scanning aspect ratio. For example, FIG. 11 illustrates an X-ray picture to be transmitted. It is relatively tall and thin whereas the scanning raster illustrated in FIG. 12 is relatively short and wide. In order to completely fill the display area with the transmitted picture, in the same aspect ratio, the camera scanning can be modified as illustrated in FIG. 13 wherein the camera raster has been modified simply by adjusting the horizontal and vertical sweep amplitudes.

The monitor at the transmitter location is illustrated in FIG. 13A and for such arrangement the monitor is set on its right side and has its sweep amplitudes adjusted as well as its deflection coils rotated by 90°. The monitor at the receiver location is illustrated in FIG. 13B and is simply set on its right side without any sweep amplitude or coil adjustment.

FIG. 14 illustrates another camera scanning arrangement to obtain the same aspect ratio as the picture of FIG. 11. In FIG. 14 the TV camera is placed on its side so that the top is to the left, with its sweep amplitudes and coils unaltered. FIG. 14A illustrates the monitor at the transmitter for such an arrangement. The monitor is placed on its left side with sweep amplitudes and coils unaltered. The monitor at the receiver location however as illustrated in FIG. 14B, is placed on its left side and has the sweep amplitudes as well as the sweep coils rotated by 90° clockwise.

In those instances where matching aspect ratios are not critical or important, the camera and monitors may be conventionally operated. Further in those instances where picture reversal is not critical, sampling of picture elements may proceed from left-to-right (FIG. 2) instead of right-to-left as described herein.

Figure 15:
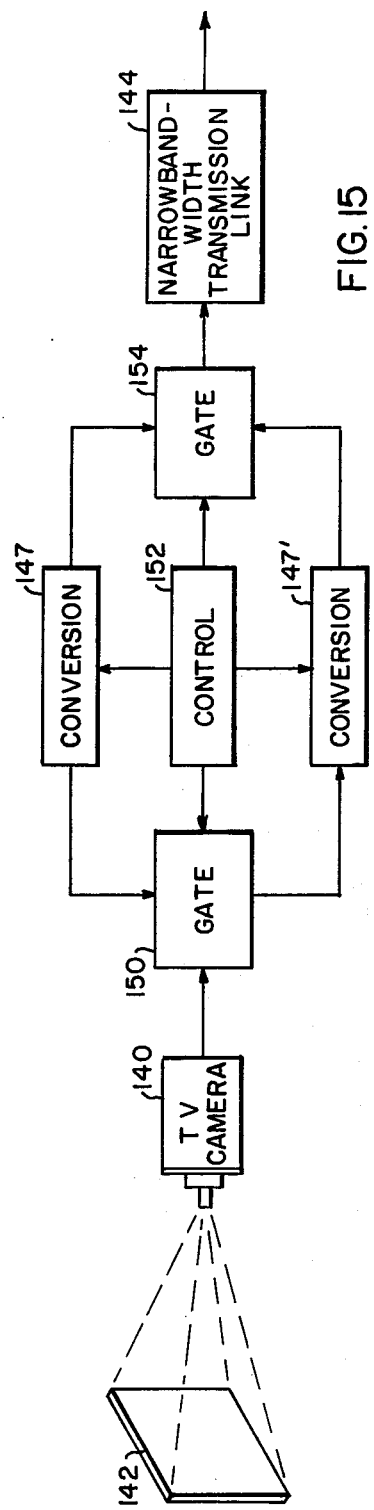
FIG. 15 illustrates an arrangement for decreasing transmission time.

In FIG. 6 there is illustrated the timing relationships for the operation of FIG. 4. In any waveform of FIG. 6 the time from D to E is greater than the time from B to C and is governed by the bandwidth of the transmission link and type of modulation used. During transmission and reading out of the storage register section 33, no sampling of a subsequent column of picture elements is taking place. FIG. 15 illustrates an arrangement whereby transmission time may be reduced by sampling a new column of picture elements while a previous one is being transmitted. The arrangement of FIG. 15 includes a TV camera 140 focused on object 142 the image of which is to be transmitted over narrow bandwidth transmission link 144.

Two identical conversion systems 147 and 147' are provided and include a sample and hold circuit, analog-to-digital converter, a shift register arrangement and signal conditioning circuits as previously described with respect to FIG. 4. The video output from TV camera 140 is provided to either conversion unit 147 or 147' through gate 150 as determined by the control circuit 152. The control circuit 152 also governs which set of stored samples either in conversion system 147 or 147' is passed to the narrow band transmission link through gate 154. Thus, while one conversion system is transmitting as from time D to E, the other conversion system is sampling and storing picture elements as from time B to C. A duplicate gating and storage arrangement would also be provided at the receiver location.

An arrangement may also be provided wherein only one sample and hold circuit, one analog-to-digital converter and one signal conditioning circuit are utilized with proper selective gating to two storage register sections.

Although FIGS. 4 and 15 illustrate standard television cameras focused on an object, the image of which is to be transmitted, it is to be understood that any source of recurrent TV signals may be provided, one example being a video disc with prerecorded signals.

Since the number of picture elements $n$ can be chosen at will, the system described herein is extremely useful in a situation using different camera or monitor standards. Thus, for example, with a single receiver station and multiple transmitter stations not only may the standard at the receiver station differ from the transmitter stations, but even the transmitter stations may have different standards. Such may be the case where X-ray pictures are to be transmitted by phone to a central hospital for diagnosis from remote offices anywhere in the world.

What is claimed is:

1. A system for transmitting a standard television picture over a relatively narrow bandwidth transmission link, comprising:
   A. means providing an information containing television signal scanned in a plurality of television lines each comprised of a plurality of adjacent picture elements;
   B. means for sampling picture elements lying along a line substantially orthogonal to the direction of line scan and deriving a reduced bandwidth television signal therefrom;
   C. means coupling said reduced bandwidth television signal to said transmission link for transmission thereof;
   D. means for receiving and processing transmitted reduced bandwidth television signals and displaying each as a single scanned line.

2. A system for transmitting a standard television picture over a relatively narrow bandwidth transmission link, comprising:
   A. means for sampling a vertical column of picture elements of a plurality of horizontally scanned television lines;
   B. means for transmitting, over said transmission link, the information represented by said picture elements; and
   C. means for displaying said transmitted information of vertically adjacent picture elements as horizontally adjacent picture elements.

3. A system for transmitting a standard television picture over a relatively narrow bandwidth transmission link, comprising:
   A. a source of television scan lines representative of information to be transmitted, each said scan line being comprised of a plurality of adjacent picture elements to be sampled;
   B. means for sampling one picture element per scanned line, of a predetermined number of lines, per television frame, the picture element being the $i^{th}$ picture element for each said line;
   C. first storage means for storing the sampled $i^{th}$ picture elements;
   D. means for transmitting the information represented by said stored picture elements over said transmission link as a reduced bandwidth television signal;
   E. display means;
   F. means for processing and displaying said transmitted reduced bandwidth television signal as a single scan line on said display means.

4. Apparatus according to claim 3 wherein:
   A. said display means is a television monitor.

5. Apparatus according to claim 4 wherein said means for processing includes:
   A. second storage means for storing said transmitted reduced bandwidth television signal;
   B. means for reading out said stored signal from said second storage means at a predetermined television rate compatible with said television monitor.

6. Apparatus according to claim 5 which includes:
   A. a rotating magnetic storage means;
   B. means for transferring the readout signal from said second storage means to said rotating magnetic storage means at one location thereof, as a signal to be displayed as a television line on said monitor, subsequent transmitted stored and readout signals being transferred to other locations of said rotating magnetic storage means to build up a complete television picture.

7. Apparatus according to claim 6 wherein:
   A. said rotating magnetic storage means is a video disc.

8. Apparatus according to claim 3 which includes:
   A. means for providing readout clock pulses to said first storage means at a predetermined rate compatible with said transmission link.

9. Apparatus according to claim 8 wherein:
   A. said source provides said lines in an interlaced system comprises a plurality of interlaced fields;
   B. said first storage means includes a like plurality of sections each for storing picture element samples from respective fields;
   C. sequential ones of said clock pulses being provided to alternate ones of said plurality of sections so that picture element samples physically adjacent in said interlaced system are transmitted adjacent in time.

10. Apparatus according to claim 9 wherein:
    A. said system is a 2:1 interlace system;
    B. said first storage means includes first and second digital shift registers;
    C. said first and second shift registers being serially connected.

11. Apparatus according to claim 3 wherein:
    A. each said scan line is comprised of picture elements 1 to $n$ in the direction of scan;
    B. said $n^{th}$ picture elements being sampled first followed by remaining picture elements in decreasing order so as not to reverse the final picture on said display means.

12. Apparatus according to claim 4 wherein:
    A. each said scan line is comprised of $n$ said picture elements;
    B. said television monitor has a raster of D displayed lines; and wherein
    C. $n = D$.

13. Apparatus according to claim 3 wherein:
    A. said source provides a total of R lines per frame; and wherein
    B. less than R lines are sampled.

14. Apparatus according to claim 4 wherein:
    A. the information to be transmitted is a picture having a certain aspect ratio; and wherein
    B. said monitor is adjusted to match said aspect ratio.

* * * * *